US007542908B2

(12) United States Patent
Segond et al.

(10) Patent No.: US 7,542,908 B2
(45) Date of Patent: Jun. 2, 2009

(54) SYSTEM FOR LEARNING A LANGUAGE

(75) Inventors: Frederique Segond, Grenoble (FR);
Thibault Parmentier, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1240 days.

(21) Appl. No.: 10/065,443

(22) Filed: Oct. 18, 2002

(65) Prior Publication Data
US 2004/0078204 A1 Apr. 22, 2004

(51) Int. Cl.
G10L 21/00 (2006.01)
(52) U.S. Cl. ..................... 704/277
(58) Field of Classification Search .......... 704/2, 704/277, 270.1; 434/156, 157
See application file for complete search history.

(56) References Cited

U.S. PATENT DOCUMENTS

| 5,721,939 | A | 2/1998 | Kaplan | 395/759 |
|---|---|---|---|---|
| 5,950,184 | A | 9/1999 | Karttunen | 707/1 |
| 6,141,528 | A * | 10/2000 | Remschel | 434/350 |
| 6,167,369 | A | 12/2000 | Schulze | 704/9 |
| 6,234,802 | B1 * | 5/2001 | Pella et al. | 434/156 |
| 6,321,179 | B1 | 11/2001 | Glance et al. | 702/189 |
| 6,321,372 | B1 | 11/2001 | Poirier et al. | 717/1 |
| 6,327,590 | B1 | 12/2001 | Chidlovskii et al. | 707/5 |
| 6,358,053 | B1 * | 3/2002 | Rosenfield et al. | 434/156 |
| 6,389,372 | B1 | 5/2002 | Glance et al. | 702/189 |
| 6,393,389 | B1 | 5/2002 | Chanod et al. | 704/7 |
| 6,405,162 | B1 | 6/2002 | Segond et al. | 704/9 |
| 6,415,368 | B1 | 7/2002 | Glance et al. | 711/158 |
| 6,493,744 | B1 * | 12/2002 | Emens et al. | 709/203 |
| 6,741,833 | B2 * | 5/2004 | McCormick et al. | 434/350 |
| 6,866,510 | B2 * | 3/2005 | Polanyi et al. | 434/157 |
| 7,043,438 | B2 * | 5/2006 | Murakami | 704/273 |
| 2001/0041328 | A1 | 11/2001 | Fisher | 434/157 |
| 2002/0072038 | A1 | 6/2002 | Wen et al. | 434/157 |
| 2002/0103882 | A1 | 8/2002 | Johnston et al. | 709/218 |
| 2002/0111789 | A1 | 8/2002 | Hull | 704/4 |

OTHER PUBLICATIONS

Bauer, Daniel; Segond, Frédérique; and Zaenen, Annie, "Locolex : the translation rolls off your tongue", ACH-ALLC95, Santa-Barbara, USA, Jul. 1995.
Brennan et al., "The Learning Content Management System: A New eLearning Market Segment Emerges", May 2001, published on the Internet at http://www.e-learningsite.com/.

(Continued)

Primary Examiner—Angela A Armstrong
(74) Attorney, Agent, or Firm—Oliff & Berridge, PLC

(57) ABSTRACT

A system operating on a network for learning a language includes a memory for storing a scenario having tasks to be carried out in the language. A connection manager accepts a plurality of connections from one or more user systems. A virtual reality subsystem represents the scenario in a physical setting. A communication subsystem provides at least one channel over which users communicate text when carrying out the tasks in the language. Linguistic tools receive and disambiguate an identified term in specified text. A search subsystem retrieves information related to the specified text. The set of linguistic tools disambiguate the identified term in the information retrieved by the search subsystem to identify example uses having a meaning similar to the identified term in the specified text to aid the users of the user systems to comprehend the text communicated in the language over the at least one channel.

20 Claims, 10 Drawing Sheets

OTHER PUBLICATIONS

Fitzpatrick, Captain James J., Ed.D., "Interactive Virtual Reality Learning Systems Are They A Better Way To Ensure Proficiency?", Massachusetts Maritime Academy, 101 Academy Drive, Buzzards Bay, 02532, USA, available on the Internet at http://www.vrmariner.com/vr_learning.html in Sep. 2002.

Kindley, Randall, "Scenario-Based E-Learning", Oct. 1, 2002, published on the Internet at http://www.elearningmag.com/elearning/article/articleDetail.jsp?id=33623.

Kindley, Randall, "Scenario-Based E-Learning: A Step Beyond Traditional E-Learning", May 2002, published on the Internet at http://www.learningcircuits.com/2002/may2002/kindley.html.

Segond, Frédérique, "A computational tool box for translators: take what you need!", 38th Conference of the American Translators Association (ATA), San Francisco, Nov. 1997.

Spectre et al., "Theoretical Underpinnings Of Games2train's Approach", available on the Internet at http://www.games2train.com/site/html/theory.html#simulation in Sep. 2002.

"A Guide to Learning Management Systems", May 2001, published on the Internet at http://www.elementk.com/downloads/lms_whitepaper.pdf (http://www.e-learningguru.com/wpaper.htm).

"The complete solution for learning and teaching foreign languages via Internet", available on the Internet at http://www.auralog.com/us/educational_esystem.html# in Sep. 2002.

U.S. Appl. No. 09/972,867 entitled "Natural language parser" (D/A0848).

U.S. Appl. No. 10/262,614 entitled "Method And System For Improving Answer Relevance in Meta-Search Engines" (D/A1471).

* cited by examiner

Morphological Analysis Results

Input: Hash the fish in a mixer then mix it with the sorrel and cooled choux pastry.

Analyze words (morphology):
    Hash hash+Noun+Sg
    Hash hash+Verb+Pres+Non3sg
    the the+Det+Def+SP
    fish fish+Verb+Pres+Non3sg
    fish fish+Noun+SP
    in in+Noun+Sg in
    in+Adj in in+Adv in
    in+Prep
    a a+Let a
    a+Det+Indef+Sg
    mixer mixer+Noun+Sg
    then then+Adv
    then then+Adj then
    then+Noun+Sg
    mix mix+Noun+Sg
    mix mix+Verb+Pres+Non3sg
    mix mix+Dig+Rom
    it it+Pron+Pers+NomObl+3P+Sg
    with with+Prep
    the the+Det+Def+SP
    sorrel sorrel+Noun+Sg
    and and+Conj+Coord
    cooled cool+Verb+PastBoth+123SP
    cooled cooled+Adj
    choux choux +?
    pastry pastry+Noun+Sg

*FIG. 5*

| General Task | Associated Responsibilities |
|---|---|
| Welcome the Customer | - Introduce oneself<br>- Provide information lists for different services (catering, cleaning, bedrooms, payment, accountancy, etc.) |
| Communicate, Writing, and Provide Assistance | - Inform customers, answer their questions about hotel facilities, organized activities, suggest interesting regional spots<br>- Search for and answers customer questions<br>- Send documentation<br>- Answer faxes, letters, emails |
| Manage Customer Data | - Register customers<br>- Fill in forms related to a customer's stay<br>- Fill in the reservations and the cancellations |
| Organize and Execute Orders | - Organize luggage services (transport, baggage checkroom, lost luggage, etc.)<br>- Make customer reservations for trains, theatre, restaurant conferences, guided tours etc. |
| Solve Problems | Record (for follow up) and answer customer complains |
| Manage Phone Calls | - Answer internal and external phone calls<br>- Transfer phone calls (to customer rooms or to appropriate hotel units) |
| Transmit Messages | - Transmit messages to customers in rooms<br>- Place wake up calls |
| Billing | - Ask for a deposit at customer arrival<br>- Prepare itemized bills (room, breakfast, laundry, drinks, phone calls, etc.)<br>- Check payment method valid |

*FIG. 9*

| Competencies Required |
|---|
| Introduce oneself and welcome the customer |
| Understand, write and send letters, fax and email |
| Write, speak, and read fluently and precisely |
| Use hotel related software |
| Find information in general (in Spanish) and to present it in English : tourist activities (find the shortest way to go to a place, price lists, find and explain available entertainment), schedules, flowers services, weather reports, esthetic services (hairdresser, beauty center, massage etc.) |
| Be creative and proactive in proposing activities |
| Explain and apply hotels rules and hotel services (cleaning, wake up, laundry, shoes cleaning, safety box, swimming pool, gym, etc.) |
| Use numbers comfortably (spelling, understanding, make calculation) |
| Extract information from different documents (e.g., emails, business cards, credit cards): locate appropriate documents, fax reservations |
| Listen and understand and answer customers complains and requests |
| Linguistic skills in language level |
| Understand and deliver messages (oral or written) |
| Understand a request (oral or written) |
| Work in team with courtesy and efficiency |

FIG. 10

SYSTEM FOR LEARNING A LANGUAGE

BACKGROUND OF INVENTION

The present invention relates generally to a system for collaborative learning, and more particularly, to a system for learning a language over a network according to a scenario that involves a work, social or functional process.

Generally, e-learning or electronic-learning has recently become a new solution for instructing new skills and knowledge to students and workers. E-learning comes in a variety of forms and can be generally defined as systems and methods that use electronic media to instruct and train individuals or groups using activities, processes, communities, and events. Content for learning may be recorded on CD-ROM, DVD, video tapes, memory, or any other digital recording medium. In addition, the content may be delivered over wired or wireless networks such as the Internet or intranets to individuals or groups operating stationary or mobile electronic devices.

Computer Based Training and Computer Online Training are examples of standalone and Internet accessible forms of e-learning. Unlike conventional self-paced forms of instruction and skill building (e.g., workbooks), these forms of instruction provide interactive tools and graphical animations that aid the learning process. Other computer based learning systems that may or may not operate on a standalone basis are Learning Management Systems (LMS) and Interactive Virtual Reality (IVR).

Learning Management Systems manage, track and report on interactions taking place between students and content and between students and instructors. Some specific features that Learning Management Systems provide include content creation and management, and student progress tracking from registration to course completion. In addition, the-tracking tools provide instructors with different ways to assess student progress.

Interactive Virtual Reality includes simulators that use virtual reality to depict real world environments, such as flight simulators. Alternatively, Interactive Virtual Reality may take the form of entertainment that defines artificial environments in which a game may take place. Using interactive virtual reality in real-world or artificial scenarios provides users with a simulated environment in which to develop both decision-making and motor skills.

Such e-learning systems have in some basic forms been applied to the field of language learning. However, these basic forms of electronic language learning are limited to CD-ROMS that define interactive videos that cannot be personalized. Consequently, maintaining student motivation and interest exist with such systems for learning languages because exercises are repetitive without any discernable contextual purpose.

Accordingly, it would be desirable to provide a system that aids students to learn the proper use of language in different contexts. Such a system would expand language learning with interactive scenarios that instruct language use in addition to language practice through collaborative activities. Such a system would advantageously improve student retention of material with exercises that take place in virtual environments that are personalized to the user's ability and interests.

It would be further desirable to provide a language learning system that is not necessarily adapted to allow users to learn a language perfectly but instead allows users to learn what they need to learn when they need to learn it. Such a language learning system would have customizable learning tools that are personalized to the user's interests and abilities so that the user is motivated to improve where the user has difficulties while at the same time increasing knowledge where the user has a depth of understanding.

SUMMARY OF INVENTION

In accordance with the invention there is provided a method, and a computerized learning system therefor, that integrates virtual reality, linguistic, collaborative and smart search technologies. Users connect to the learning system over a network such as the Internet. The learning system has collaborative elements that allow users to interact both synchronously (e.g., chat) and asynchronously (e.g., email). Virtual reality provides a cognitive context in which users learn, while smart search technologies provide personalized access to information, texts and documents available on the network that relate to a subject being learned as well as the language level of the user.

Generally, the learning system is adapted to enable distance learning through pedagogy, content, virtual reality, interaction (synchronously and asynchronously), gaming, linguistic technologies, collaborative tools, and smart information retrieval. In particular, the language learning system develops language understanding by presenting users with a scenario that is carried out using tools for listening, reading and writing language. The scenario may for example put a user in a real-world situation where the user is given access to tools necessary for carrying out tasks set forth under the scenario. For example, a work scenario may involve reading emails, searching for and understanding information, writing and making presentation, ordering meals, interacting with colleagues and customers, and discovering cultural events.

To this end, the language learning system integrates collaborative technologies that allow users to share information identified on the network that aid in carrying out the scenario, or alternatively to share information that aid in language learning. In addition, the linguistic tools provide autonomy for users to learn on their own by giving different ways to illustrate concepts by providing examples of word use in the context in which the word is used besides a translation of the word. Contextual analysis of word use by the linguistic tools includes both syntactic disambiguation (e.g., differentiating between the verb "bark" and the noun "bark") and semantic (or sense) disambiguation (e.g., differentiating between the meaning of the nouns "the tree bark" and "the dog's bark").

In accordance with one aspect of the invention, the learning system, which operates on a network, includes a memory for storing a scenario having tasks to be carried out in the language. A connection manager accepts a plurality of connections requested over the network from one or more user systems. A virtual reality subsystem represents the scenario in a physical setting in a user interface operating on each user system connected to the learning system. A communication subsystem provides at least one channel over which users of the user systems communicate text when carrying out the tasks in the language. A set of linguistic tools receives and disambiguates an identified term in specified text received from one of the connected user systems. A search subsystem retrieves information on the network related to the specified text. The set of linguistic tools disambiguates the identified term in the information retrieved by the search subsystem to identify example uses having a meaning similar to the identified term in the specified text to aid the users of the user systems to comprehend the text communicated in the language over the at least one channel.

Advantageously, the learning system provides means for a user of the system to learn precisely what the user seeks to learn (i.e., precision learning). In addition, the learning system has the advantage through its use of scenarios of providing highly personalized, user centered, granular, on demand learning. Teachers become tutors that support a user's work as the user begins to understand what needs to be learned and what tasks need to be performed and what tools can be used to accomplish those tasks by collecting information available on the network and exchanging information with other users using for example the collaborative tools.

A further advantage of the system is its use of virtual reality that provides both interaction and personalization to users of the system. With respect to interaction, users are allowed to represent themselves as they wish using virtual reality (e.g., role play). For example, each user is provided with an avatar, a representation of themselves in the virtual reality world. Users can meet with other avatars or robots to interact or learn how to use tools necessary for carrying out assigned tasks in their scenarios. The gaming aspect of virtual reality makes users more free to express themselves.

Yet another advantage of the learning system is its use of scenarios that provide users with an interactive situation in which task need to be carried out. Unlike email interaction, users interact in a collaborative setting where they are able to help each other. An important aspect of learning is being able to teach what a user has learned.

This learning environment provides users, through scenarios, with collaborative and linguistic tools for both learning and enforcing what they have learned by teaching others what they have learned. This enables a cycle of learning and reinforcement by having to teach others what they have learned.

More specifically, scenarios allow users to immerse themselves directly in "prototypical situations" linked to other aspects besides language that they need to learn. For example, if a user needs to learn a language for use at work, the scenario can be focused on everyday life at work (as opposed to home), including a representation in virtual reality of the actual work setting. That is, through customization of scenarios to the profile of a user, users are provided courses that suit their needs and level (both language and process (e.g., work)), by using a virtual reality representation of their process environment (e.g., work environment) as well as the language (or terminology) specific to (e.g., technical terms) or common to (e.g., colloquial terms used in a region or setting) an environment.

Yet an additional advantage of the invention is that the linguistic technologies provide users with yet another method for broadening their comprehension of language and interactive ability as well as reinforcing their understanding of proper language use. For example, terms in documents retrieved for carrying out a scenario can be automatically identified for a user that relate to the scenario. For example, astronauts that need to learn a common language can analyze technical documents to identify terms that have a specific meaning in their domain. Furthermore, the linguistic tools in the virtual reality setting provide a personalized aspect while being a part of a collective course.

Further advantages of the present invention include benefit to users through controlled and efficient access to information on the network, promoting learning at the user's own speed and rhythm. In accordance with this aspect of the invention, a language guesser provides means for identifying language uses other than the language specified or permitted. This relieves the tutor or instructor from having to check whether users are expressing themselves in the appropriate or desired language. In this way, the system supports tutors and instructors in language and process instruction.

The smart information retrieval further strengthens the personalized and interactive aspects of the present invention by taking into account a user's interests or needs when performing searches through the use of a detailed user profile. Thus, by retrieving information that is of interest to a user, a user is more apt to read it in depth, thereby improving learning efficiency. In addition, collaborative technologies can further be used to propagate the information to other users that have similar interest, thereby sharing the benefits with other users.

BRIEF DESCRIPTION OF DRAWINGS

These and other aspects of the invention will become apparent from the following description read in conjunction with the accompanying drawings wherein the same reference numerals have been applied to like parts and in which:

FIG. 5 illustrates example results of a sentence that has been morphologically analyzed;

FIG. 9 sets forth example tasks in a scenario where employees work at a hotel reception desk; and FIG. 10 sets forth example competencies required to carry out the tasks in FIG. 9.

DETAILED DESCRIPTION

A. Overview of Learning System

Figure 1:
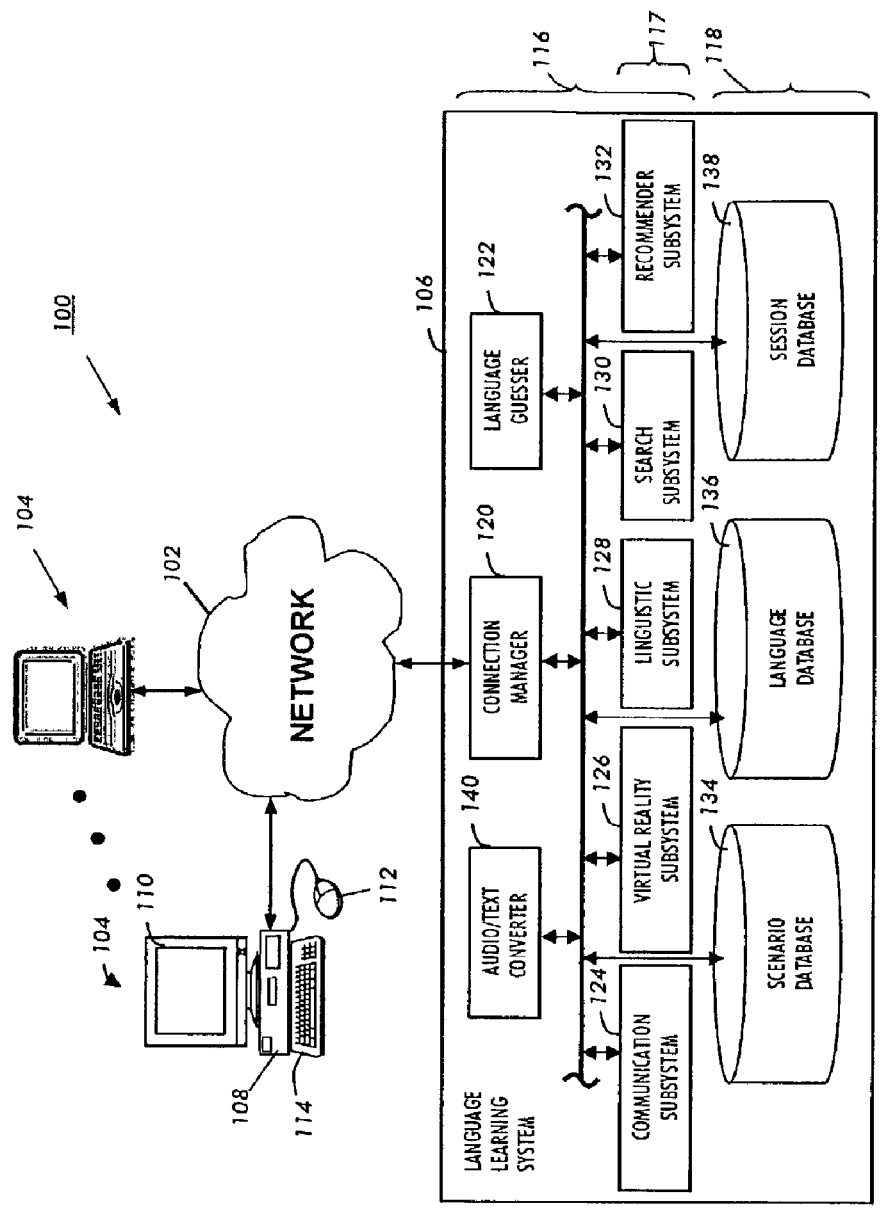
FIG. 1 illustrates an example of an operating environment for performing the present invention.

FIG. 1 illustrates an example of an operating environment 100 for performing the present invention. In the operating environment 100, a network 102, such as the Internet or an intranet, operatively couples at least one user system 104 to language learning system 106 (also referred to herein as learning system 106). The user system 104 includes a processing unit 108, display 110, pointing device 112, and keyboard 114.

Forming part of the learning system 106 is a plurality of components 116 and databases 118 accessed by the components 116 to carry out the present invention. The components 116 include a connection manager 120, language guesser 122, audio/text converter 140, and a plurality of subsystems 117 (i.e., communication subsystem (or chat service) 124, virtual reality subsystem 126, linguistic subsystem 128, search subsystem 130, and recommender subsystem 132). The databases 118 include a scenario database 134, a language database 136, and a session database 138.

The connection manager 120 receives requests over the network 102 from the user systems 104 to connect and login to the language learning system 106. Each user of the learning system 106 is assigned an account with which to login when a connection is made. Each account has associated therewith a user profile that is stored in the session database 138 and that specifies user preferences and interests.

Each user profile is used by the learning system 106 to customize (i.e., personalize) the learning environment for a user or group of users, as described in more detail below.

Figure 2:
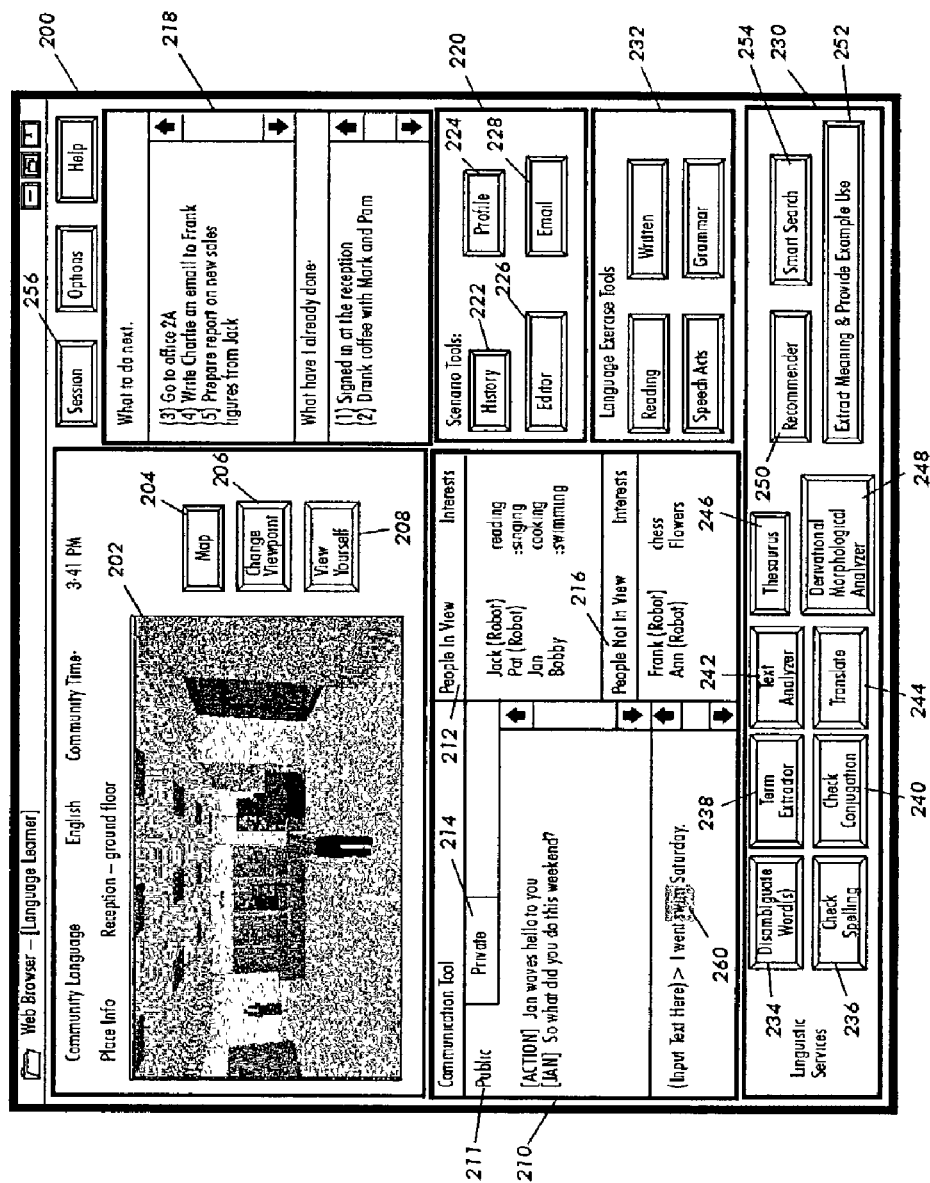
FIG. 2 illustrates an example user interface operating at each user system connected to the language learning system shown in FIG. 1.

Once logged in, the connection manager 120 and the subsystems 117 generate for display at each connected user system 104 a user interface having plurality of frames and/or windows. An example user interface 200 is shown in FIG. 2. The subsystems 117 provide a variety of functions that are accessed through the user interface 200 using a conventional web browser (e.g., Microsoft Internet Explorer) by a user, the details of which are described below while simultaneously referring to FIGS. 1 and 2.

The user interface 200 is dynamically built when a user connects to the learning system 106. Depending on the user's session history and profile, the user interface 200 will specify different tools and/or scenario information. That is, content displayed to a user on the user interface 200 is adapted to a user's linguistic level (e.g., by reviewing chat session history), scenario tasks that have already been achieved (e.g., by reviewing scenario task history), and interests (e.g., additions to the recommender subsystem 132 or settings in a user profile).

The audio/text converter 140 converts audio to text using well-known voice recognition software and text to audio using well-known text-to-speech synthesis software (or alternatively pre-recorded audio tracks). Depending on options specified, a user may interact with the language learning system 106 in one of three modes: text only, voice only, or combination of voice and text. In one embodiment, the language learning system converts all audio to and from text so that it may react to identified key words and identify the language using language guesser 122. In this embodiment, a user communicating with the system using voice may request to view all translations of speech received and/or transmitted, in order to apply linguistic services thereto as described in more detail below.

B. Virtual Reality and Chat

In general, the subsystems 117 operate together to create a personalized scenario for each connected user. In this regard, the virtual reality subsystem 126 and communication subsystem 124 operate together to provide a text-based or symbol-based interactive virtual reality environment, where "symbol" is defined herein as any natural language symbol (i.e., alphanumeric characters and other orthographic natural language representations, and phonemes for phonetic systems). The virtual reality subsystem 126 provides a scene that induces users to learn in a cognitive context that relates to a scenario.

In operation, a scene in a scenario is viewed in a frame 202 which provides a three dimensional representation of a physical setting as well as tools to move around the physical setting (e.g., map tool 204, change viewpoint tool 206, and view yourself (in the setting) button 208). A user communicates with other users (e.g., students or instructors) in the physical setting, using a communication tool 210 that establishes a communication channel (or channel) for transmitting symbols to others users either in a public setting at 211 (e.g., to all people in view as identified at 212) and a private setting at 214 (e.g., to specifically identified participant(s) at 216). In addition, users when in the public setting receive information concerning actions of users shown in the frame 202 representing the physical setting.

In the frame 202, a user is represented by an avatar, the properties of which can be set in the user's profile accessible at 224. A user's avatar may be removed from the user's frame 202 using the view yourself button 208. Using the chat tool 210, users communicate with other users (in the context of their avatars in the frame 202) or with robots that are directed by the virtual reality subsystem 126 for carrying out a scenario. For example, the role of a receptionist at a business may be played by a robot because the interaction is typically well defined.

The personalized scenario of a user is depicted in frame 218 where a user is told what has already been done and what needs to be done next. As part of completing tasks defined by the scenario, a user is provided with a set of tools, as shown for example in frame 220. These tools are personalized for each scenario recorded in scenario database 134. A history button 222 brings up a window that allows a user to view prior history either created by the user's earlier actions or developed as part of the scenario. A profile button 224 brings up a window that allows a user to view any predefined or user settable characteristics that defines the user's profile in the scenario.

In addition, the scenario tools 220 include tools for carrying out the scenario, such as editor tool 226 and email tool 228. Advantageously, by carrying out tasks specified in a scenario, a user learns the use of tools and processes necessary for carrying out task assignments. Thus a user is allowed to learn a language while simultaneously learning from the scenario a work or social process and the tools necessary to carry out the work or social process. Similarly, this technique can be used to learn a language in a functional domain such as driving a car.

The communication subsystem 124 allows users to interact together by exchanging text (or audio that may be converted to text). In accordance with one aspect of the invention, the language guesser 122 is operatively coupled to the communication subsystem 124. In operation, the language guesser monitors the language of text transmitted over the communications channels formed with users by the communication subsystem. In one embodiment, languages are identified using techniques disclosed in U.S. Pat. No. 6,167,369, entitled "Automatic Language Identification Using Both N-Gram And Word Information", which is incorporated herein by reference.

More generally, the language guesser 122 operates with the communication subsystem 124, the linguistic subsystem 128, the search subsystem 130, and the recommender subsystem 132 to identify languages other than a specified language or languages. If the identified language is other than the specified language, then the subsystems can use that information to filter out content that is other than in the specified language, refuse to transmit or receive (i.e., block) transmission in other than the specified language, or limit the scope of and results received from queries.

Advantageously, the language guesser 122 provides a mechanism for controlling and directing the use of the language by the users of the language learning system, thereby promoting language practice and use. A further advantage of the operative coupling of the language guesser and the communication subsystem is that users acting as tutors or instructors (as opposed to students) do not need to monitor that student use of the communication channel is in the desired language or languages. A similar advantage exists when retrieving language specific information with the search subsystem and when sharing information with the recommender subsystem.

C. Search and Recommender Tools

The search subsystem 130 is a smart search engine that is adapted to retrieve multilingual documents that match a profile of a user, thereby personalizing search results of a user.

The profile of a user includes a plurality of categories that include those directed at language difficulties and/or strengths, personal interests, functional interests or proficiencies (i.e., process or functional skills).

For example, a user with a profile that specifies an interest in American politics with a difficulty using idiomatic expressions in French, will produce the following result with the search subsystem 130. Using morph-syntactic analysis and ontological analysis of retrieved results, the smart search subsystem 130 will provide the student with search results that concern American politics that contain idiomatic expressions.

The search subsystem 130 may be used to search public domains on the Internet or private or semi-private domains on intranets (e.g., company intranets or subscription databases). For example, a company's intranet may be useful to identify relevant technical material in a domain of interest identified in the profile of a user. In addition, the search subsystem may be used to search user email at 228 to identify related information.

In one embodiment, the smart search engine is a meta-search engine that searches multiple repositories and data types with a single query such as askOnce™, which is commercially sold by Xerox Corporation. In another embodiment, the smart search engine is a meta-search engine that includes methods for performing and improving meta-searches as disclosed in U.S. patent application Ser. No. 10/262,614 (now U.S. Pat. 6,829,599), entitled "Method And System For Improving Answer Relevance In Meta-Search Engines", which is hereby incorporated herein by reference.

In addition, the recommender subsystem 132 provides a mechanism for filtering and categorizing information available on the network 102 in order to keep or regroup potential relevant information. Generally, the recommender subsystem 132 provides personalized recommendations that take into account similarities between people based on their user profiles. One embodiment of the recommender subsystem 132, called Knowledge Pump™, has been developed by Xerox Corporation.

Knowledge Pump provides users with personalized recommendations of documents. Users join communities of people with similar interests. Profiler agents track and map each user's interests, learning more about the user each time Knowledge Pump is used. A recommender agent finds matches between new items and user preferences, automatically sending relevant and high quality information to people as it is found. Knowledge Pump helps communities (such as a learning community), defined by their common interests and practices, to more effectively and more efficiently share knowledge.

A principle element of the Knowledge Pump is the recommendation functionality that is based on community-centered collaborative filtering which filters both by content and by taste (i.e., user preference). Knowledge Pump handles content filtering by relying on user recommendations to classify items into pre-defined communities. Social filtering, matching items to people by first matching people to each other, is accomplished using statistical methods and profiles of a collection of users.

Further details of Knowledge Pump is disclosed in the article entitled "Making Recommender Systems Work for Organizations" by Natalie S. Glance, Damiá n Arregui and Manfred Dardenne, Proceedings of PAAM, 1999, which is incorporated herein by reference. Further background of the recommender subsystem 132 is disclosed in U.S. Pat. Nos. which are hereby incorporated herein by reference: U.S. Pat. Nos. 6,415,368; 6,389,372; 6,327,590; 6,321,179.

Advantageously, student users of the recommender subsystem 132 are given access to very qualified and annotated databases of documents. In this way, student users are able to more quickly identify relevant information. A further advantage is that instructor or tutor users are able to analyze student understanding by reviewing comments of documents and recommendations made concerning a particular topic assigned in a scenario.

Figure 3:
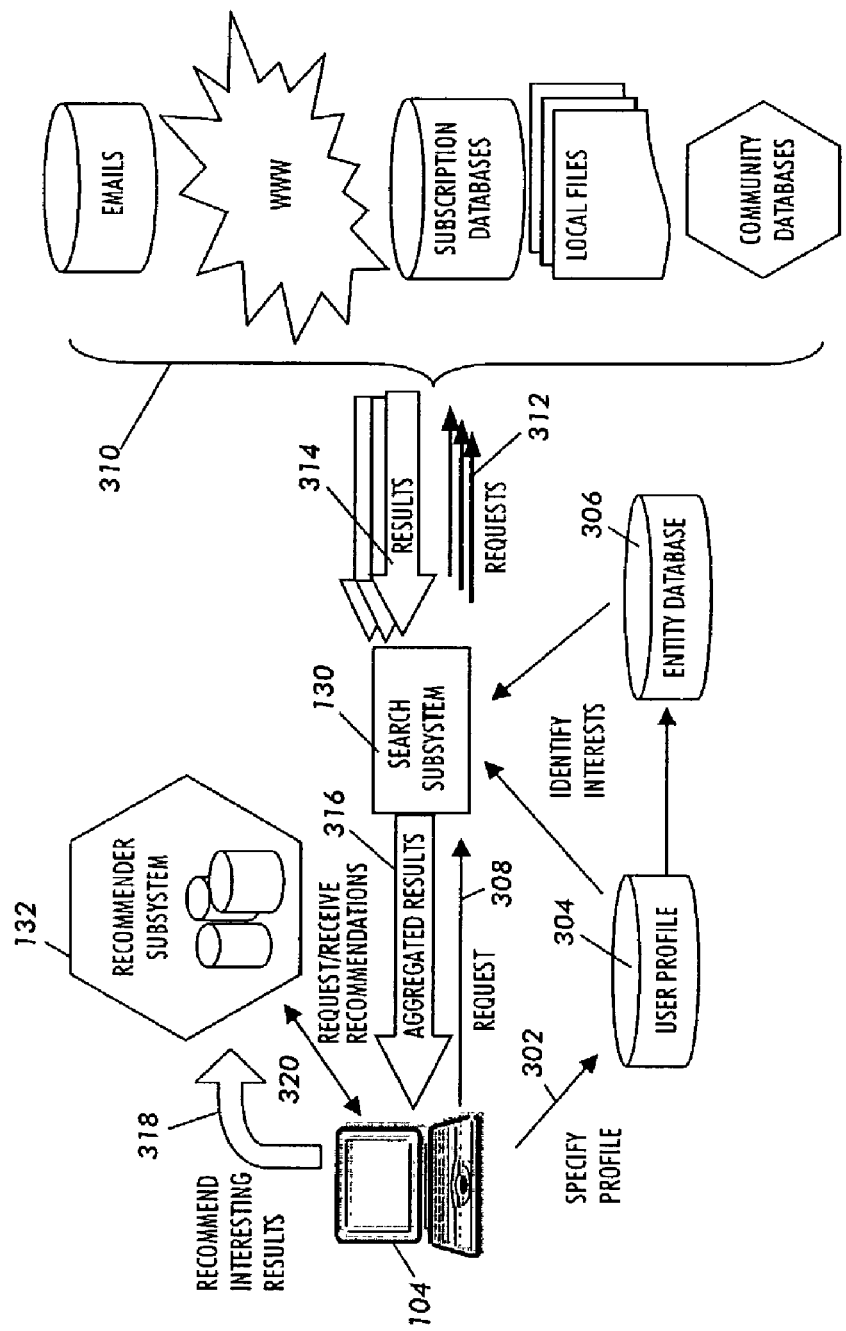
FIG. 3 illustrates an example in which a user operating a user system interacts with the search subsystem and recommender subsystem.

FIG. 3 illustrates an example in which a user operating a user system 104 makes use of the search subsystem 130 and recommender subsystem 132 together. Initially, a user specifies (at 302) a user profile 304 that forms part of the session database 138. The user profile 304 identifies an entity database 306 that specifies entities related to users interests. The recommender and smart search utilities are invoked by a user by selecting buttons 250 and 254 in the user interface shown in FIG. 2.

In operation, the user system 104 sends a query formulated by a user to the search subsystem 130, as shown at 308 in FIG. 3. The search subsystem 130 makes use of the user profile 304 and/or the entity database 306 to select information sources 310 and/or to formulate searches at 312 and filters search results 314 to provide aggregated results back to the user system 104 at 316. The user selects entries in the aggregated results and recommends them to a community in the recommender subsystem 132 at 318. In addition, in response to requesting recommendations from the recommender subsystem 132, the user receives recommendations at 320.

D. Linguistic Services and Scenario Tools

Also forming part of the user interface 200 are linguistic services 230 that provide the user with contextual translation with semantic disambiguation. In addition, language exercise tools 232 provide written, reading, grammar, and verbal exercises in the community language. Advantageously, the language exercise tools 232 and the communication tool 210 may be used with the linguistic services 230, as described in more detail below.

The linguistic services 230 and scenario tools provide a set of specific functionalities that can also be accessed by selecting elements illustrated inside the frame 202. That is, users may access tools by clicking on their associated buttons in the frame 230 or their three dimensional representation in the scene depicted in the frame 202. For example, a user may access the smart search tool at button 254 or by clicking on a computer found in a scene of the frame 202 representing a library. Similarly, a user may bring up the email tool available using button 228 or by clicking on a computer found in a scene of the frame 202 representing the user's office. As the scene represented in view 202 mimics the real world, users are also given access to similar tools that are available in the view. Thus, users are trained to not only use a tool but to anticipate where to expect to find the tool in a real world environment.

Figure 4:
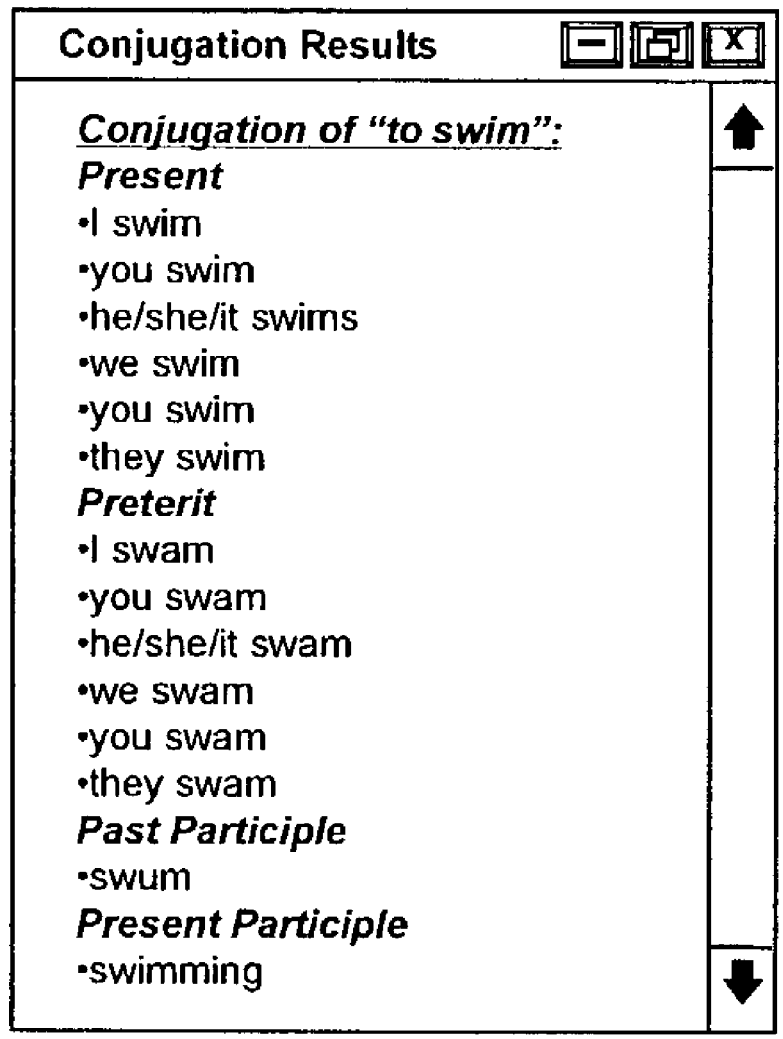
FIG. 4 illustrates example results of a verb for which conjugations have been requested.

A function of the linguistic services 230 is to provide comprehension help to users through different contextual levels of translation. At a first level, translation (at 244), spelling (at 236), thesaurus-lookup (at 246), conjugation-lookup involves a straight forward word-for-word analysis. For example, words typed into the chat tool 210 can be selected and quickly analyzed for mistakes using the first level tools. As shown in FIG. 4, conjugations for the highlighted word "swim" 260 (shown in FIG. 2) are shown in a separate window in response to selecting the check conjugation button 240.

At a second higher level, translation, spelling, and conjugation, can include syntactic and semantic disambiguation (at 234) for a word or group of words to provide a list of examples ordered by appropriateness in the context in which the word is used. In one embodiment, the linguistic services that include tokenization, morphological analysis and part of speech disambiguation are integrated using the XeLDA framework developed by Xerox Corporation. Further background for integrating linguistic services is disclosed in U.S. Pat. No. 6,321,372, which is hereby incorporated herein by reference.

In one embodiment, the linguistic services use networks of finite-state transducers that encode one or more a finite languages. These networks are stored in language database 136, which for example may include networks for the following languages: French, English, Spanish, German, Japanese, Chinese, Russian, Arabic, Portuguese, and Italian. Input to the linguistic services is tokenized using a basic language-independent tokenizer that uses spaces and punctuation marks to tokenize and language-specific pattern-based tokenizers for a number of languages, such as finite-state machine tokenizers. The tokenizers divide a sequence of input characters into tokens (i.e., basic units such as paragraphs and sentence words). Additional background for tokenization is disclosed in U.S. Pat. No. 5,721,939, which is incorporated herein by reference.

Morphological analysis is then performed to associate each token (e.g., left) with its normalized and potential part of speech categories (e.g., left/Adj, leave/Verb {past,pastpart}). Such analysis can be performed using for example the natural language parser disclosed in U.S. patent application Ser. No. 09/972,867, which is incorporated herein by reference. Using tokenized input, the natural language parser segments linguistic units (e.g., words) into a series of groupings. For example, FIG. 5 illustrates example results of a sentence that has been morphologically analyzed (by selecting 242). More generally, users access verb conjugations and normalized part of speech categories using morphological analysis of selected symbolic content.

Figure 6:
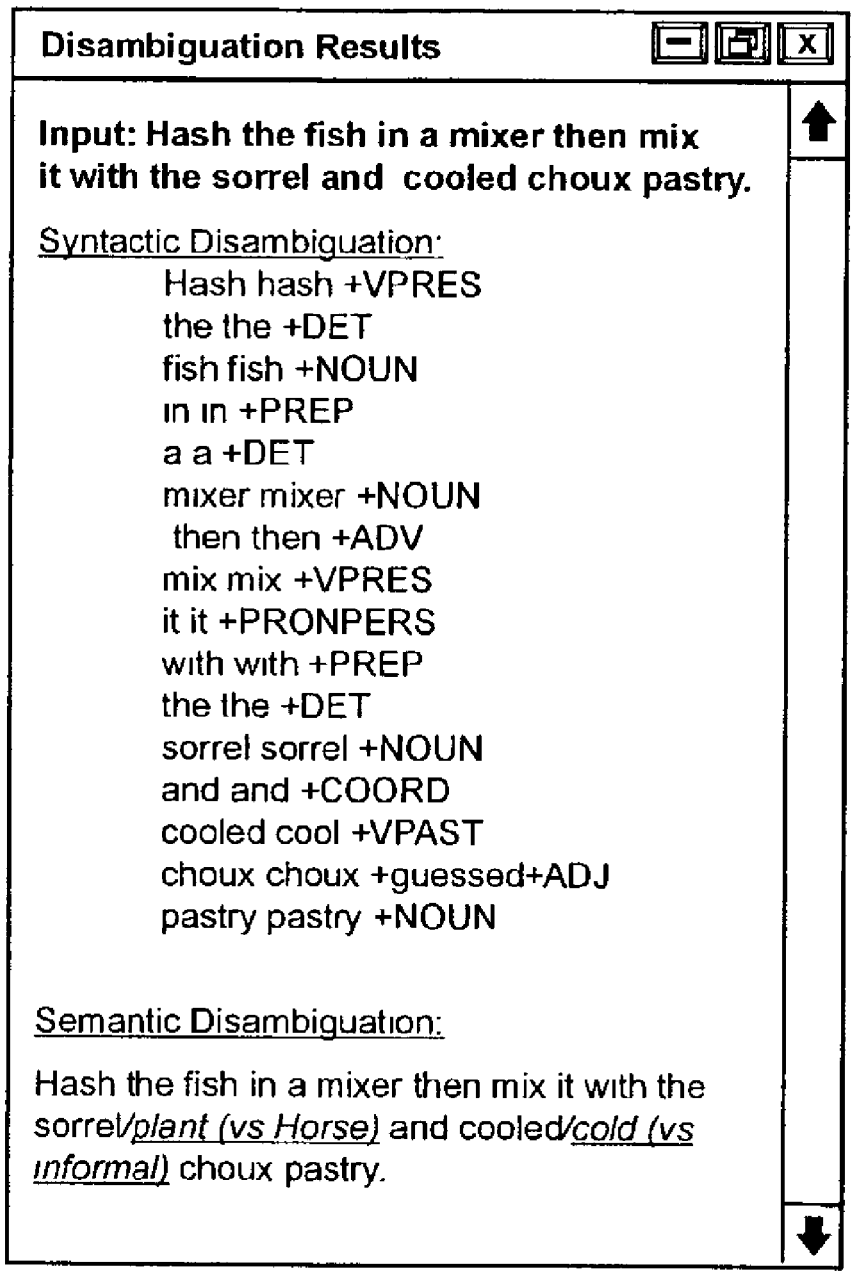
FIG. 6 illustrates example results for both syntactic and semantic disambiguation of a group of words.

In addition, the natural language parser identifies dependencies between the linguistic units to disambiguate their meaning syntactically and semantically. More details for performing semantic disambiguation are described in U.S. Pat. Nos. 6,405,162 and 6,393,389, which are incorporated herein by reference. FIG. 6 illustrates example results for both syntactic and semantic disambiguation of a group of words.

Syntactic disambiguation determines whether the manner in which a word is used that has different syntactic uses (e.g., a noun or a verb) is correct. For example, as shown in FIG. 5 the term "hash" can be either a noun or a verb. As shown in FIG. 6, its use within the context of the sentence has been determined to be used as a verb in the present tense. Also shown in FIG. 6, the use of the term "sorrel" has been semantically disambiguated as in the context of the sentence as meaning a plant instead of a horse.

Figure 7:
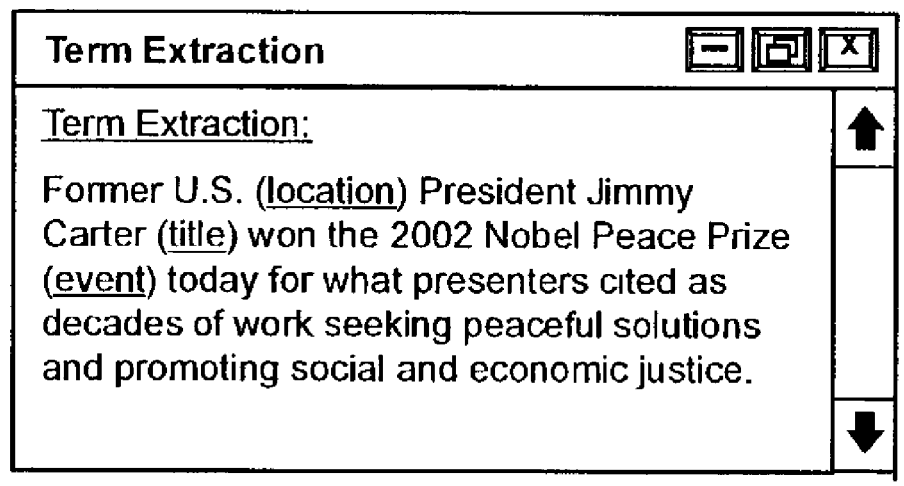
FIG. 7 illustrates example results for term extraction performed on a group of words.

Additional linguistic services include term extraction (at 238) and derivational morphological analysis (at 248). Generally, term extraction involves identifying known terms using a dictionary of, for example, proper nouns. Term extraction may also be used in aligning translations as disclosed in U.S. patent application Ser. No. 09/737,964, which is incorporated herein by reference. FIG. 7 illustrates example results for term extraction performed on a group of words, where one interpretation of their meaning is provided. Derivational morphology involves the grouping of a word with the same derivational family. It allows users to discover words in a similar family and improve user vocabulary. For example, the word "knob" belongs to the derivational family "knobbed", "knobby", and "knob-like".

Figure 8:
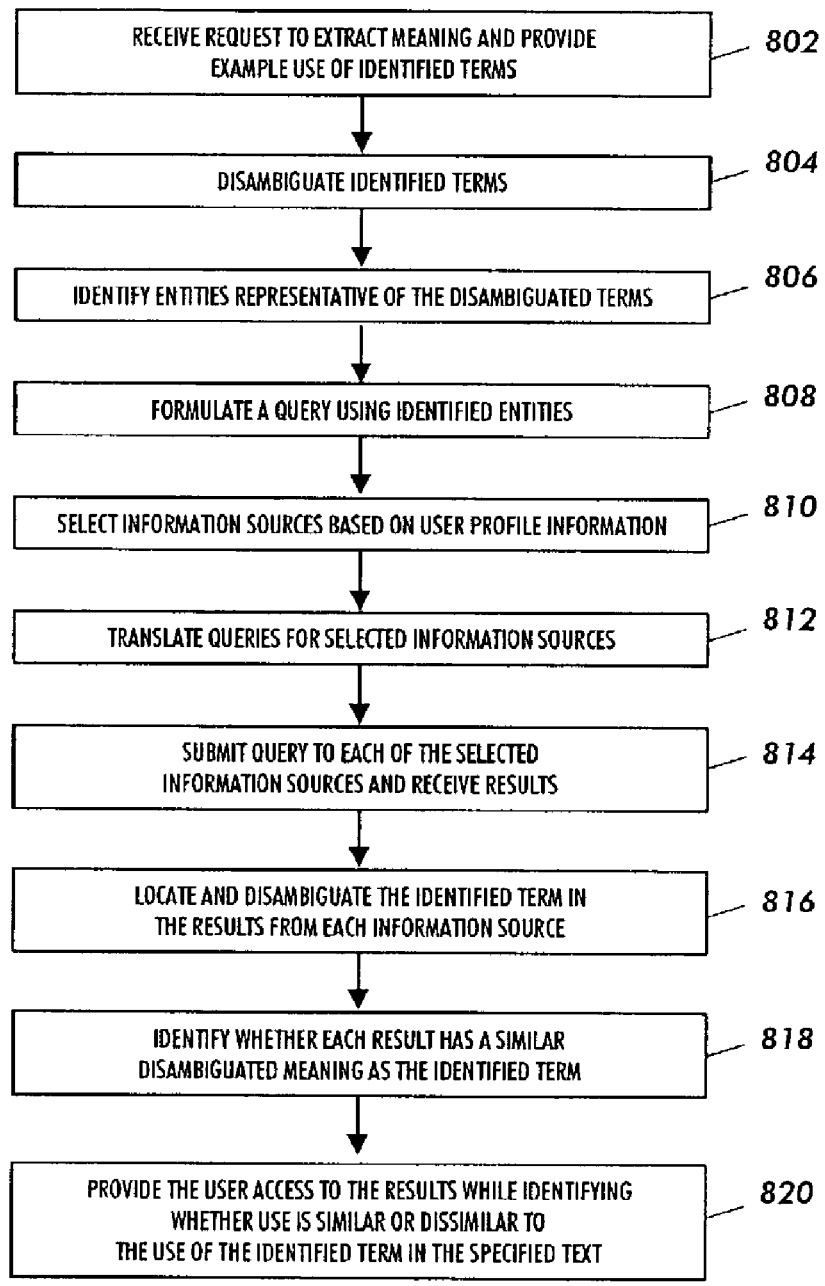
FIG. 8 is a flow diagram of actions performed by the linguistic subsystem and search subsystem to carry out the service of providing example use of specified content.

In accordance with another aspect of the invention, semantic disambiguation of the linguistic subsystem 128 and the search subsystem 130 provide an alternative to machine translation by providing a service that extracts meaning of a specified text and provides example use (at 252), both similar or dissimilar context. FIG. 8 is a flow diagram for carrying out this service for providing example use in an original language in lieu of a translation into a target language. Using the service the pedagogical process is different: instead of providing a user with a translation, the user is instead provided with contextual uses of the word or phrase in the original language.

In FIG. 8, the service begins by receiving a request to extract meaning and provide example use of identified terms (at 802). For example, the identified terms may be text selected in the communication tool 210 shown in FIG. 2. The linguistic subsystem 128 disambiguates identified terms (at 804) using, for example, text surrounding the identified terms or communications over a communication channel of the communication subsystem. Entities representative of the disambiguated terms are identified (at 806) and used to formulate a query (at 808).

Information source for which the query is translated (at 812) and to which the translated queries are sent (at 814) are selected using the user profile of the user submitting the request (at 810). Results for the search performed by the search subsystem 130 are disambiguated (at 816) to identify examples of using the identified terms in similar or dissimilar contexts (at 818). The results are provided to the user showing similar and dissimilar contextual use of the identified terms in the specified text (at 820). The results may come in the form of sentences or paragraphs with the relevant term or terms highlighted.

In accordance with yet another aspect of the invention, users are provided with customizable services that allow analysis of textual content either they produce or receive for better understanding and correctness. Advantageously, users are able to learn by example using linguistic tools that can be used to highlight specific language constructions such as functional relations, terminology, and idiomatic expressions.

In accordance with a further aspect of the invention, the linguistic tools measure language level over the communication channels of the communication subsystem. Language level can be defined by the type of terms used and the correctness of their use. In addition, language level can also be used to measure the appropriateness of language use in a social context (e.g., home versus work). Tutors or instructors can be alerted when the measured language level falls below a predetermined threshold level. Similarly, the communications channel can be filtered from language falling below an acceptable social threshold level. In addition, robots can adapt their use of language to a predetermined level or to the level measured in use by the users. In one embodiment, the language level is measured by the presence or absence of a set of key words in a communication.

E. Example Scenario

This section presents an example scenario that provides English and vocational training for the hotel personnel who speak Spanish. The scenario enables the development of English skills necessary for tasks performed by hotel personnel as well as vocational training as an hotelier. The scenario tasks and materials are designed to develop oral comprehension and reading skills to enable Spanish-speaking hotel personnel to communicate with English-speaking customers.

Advantageously, the scenario can be used on-site at hotels or over the Internet to either provide continuous vocational training to hotel professionals or to test the skills and abilities of prospective candidates for employment as hotel professionals. The scenario is developed to meet the specific English language needs of Spanish speaking hotel employees working at various positions in the hotel (e.g., the reception desk). Tasks carried out to complete the scenario will comprise reading and comprehension exercises that simulate hotel procedures in a virtual real-world setting or situation.

By completing the scenario trainees will learn vocational skills and language skills specific to their assigned tasks in the scenario. The vocational training will promote the use of technology necessary to carry out their assignments as a professional. In addition, trainees are given on-line and/or off-line access to language training materials. Generally, the training will include exercises and training by role-playing using the language learning system.

The objectives of the scenario are for trainees to: a) develop language skills necessary to communicate with hotel guests in their role as a hotel professional; b) develop social skills necessary for supporting their role (e.g., receptionist) such as efficiency, courtesy, initiative, teamwork; and c) develop technical skills necessary to carry out their role such as use of the computer, fax machine, email, etc.To achieve these objectives the scenario makes use of innovative-pedagogical approaches and methodologies of the language learning system.

Using the language learning system, trainees may learn through the Internet. The training provided by the scenario complements a face-to-face course to provide what is called blended learning. The language learning system provides focused, on demand learning to trainees, allowing them to learn what they need to learn, at the moment they need it, wherever they are. Advantages of the language learning system are that it can be personalized, interactive, and granulized. When using the language learning system trainers take on qualities of tutors that support trainees' work. A further advantage is that trainees are apt to become more involved in the learning process by carrying out scenario tasks, collecting information on the Internet, and exchanging information with other trainees as well as with tutors.

The language learning system 106 as discussed above integrates textual communicative tools 124, virtual reality 126, linguistic 128 and collaborative 132 technologies, and a smart (multilingual) search engine 130. In a cognitive sense, virtual reality aligns trainees with the topic of the course. In other words, virtual reality strengthens the personalization aspect of the language learning system. In the case of training in the hotel industry, trainees are able to learn how to communicate in English in hotel situations, but also that they are able to learn their everyday work processes.

More specifically, the virtual reality scenario places trainees in their everyday working context, such as the reception of a hotel. The scenario engages them in different situations where they role-play real world situations. During the training process trainees have to cope with their everyday work situations, such as interacting with angry customers, answering customer requests, or interacting with colleagues. Customized scenarios encourage trainees to interact, thereby promoting language use and familiarity with general hotels procedures.

Virtual reality in combination with linguistic and collaborative technologies allows trainees to speed their comprehension, by helping them communicate more efficiently and learning vocabulary particular to their domain of expertise. For instance the use of the wrong or improper word will lead a trainee into a more difficult scenario where customers complain. The other advantage is that trainees can work with documents from actual work situations. The collaborative and search tools will familiarize trainees with their everyday job by allowing them to search for the hotel information.

In addition, the collaborative technologies will encourage trainees to work as a team. For instance when facing a difficult customer they will have to search for solution with other trainees, the same way they will have to work as a team at the reception desk. Collaborative technologies also allow trainees to share best methods for handling particular situations with customers or share best responses to customer concerns or questions.

To summarize, the integration of virtual reality, linguistic, collaborative and smart search technologies in a networked language learning system provides the following advantages: (a) virtual reality encourages interaction because of the cognitive context it implies for the trainees; (b) smart search technologies allow trainees to retrieve information, texts and documents from Internet or specialized databases related to a specific subject that matches their language level; (c) collaborative technologies allow trainees to share information gathered on the Internet or specialized databases with other trainees; (d) linguistic tools provide trainees with autonomy by providing examples of concepts that promote the understanding of the use of words in different senses within a particular context.

E.1 Tasks Descriptions, Technical Skills and Activities

FIGS. 9 and 10 show example tasks associated with scenarios that are carried out at a hotel's reception desk as well as the technical skills required for carrying out the tasks. FIG. 9 sets forth example tasks for employees working at a hotel reception desk, which include general tasks and their associated responsibilities.

FIG. 10 sets forth example skills required to carry out the tasks in FIG. 9.

Generally, a trainee and tutors (i.e., users) may use the language learning system either at the same time (synchronously) or whenever they want (asynchronously). Activities immerse trainees in a virtual hotel where they will be given roles to play that correspond to the different prototypical hotel situations. All trainees will be assigned a role to play. The tutors can assign the roles played by trainees. Trainees can be given either the role of customers or hotel personnel, or both.

Alternatively or in addition, customers (i.e., guests) and hotel personal could be robots that interact with trainee avatars in a virtual reality scene. Each robot is a three-dimensional human representation that is pre-programmed to play a specific role in virtual reality. For example, robots can invite users to chat, react to certain stimuli such as predefined list of words, movements of others in the virtual reality scene. Avatars, the three-dimensional representation of users, decide where to go in the virtual reality scene, with whom they want to interact, and what to say, whether it is with another avatar or a robot.

Language interaction is limited to English in certain circumstances and automatically enforced using the language guesser. In order to support interaction among trainees and to strengthen the game aspect, trainees are asked to work in groups. Each group of trainees is present in scenes at the same time, and interacts individually with different robot customers. Because they are in the same room at the same time they will also be able to communicate among themselves when they have difficulties. The tutor-avatar can also be present in real time or later review trainee discourse in a session history accessed at 256 and recorded in the session database 138.

To interact trainees and tutors can either type text in the chat window or communicate verbally or a combination of both. The language learning system converts verbal communication to text for immediate processing and recording in the session history for later analysis by the user or tutor. The textual or verbal discourse communicated over the communication channels may include dialogue or alternatively assigned tasks such as completed reports, forms, or exercises.

E.2 Scenario Scenes

Traditional linguistic exercises, cards with grammar or speech act hints provided to users of the system concern the activities of each scene. In the virtual scenes trainees are given access to scenario tools such as a phone, fax, reservation book, computer, documents internal to the hotel (regulations, menu, price lists, tourist information, etc.) to carry out the requested tasks of the scenario. The language permitted in a scene depends on the situation. For example, a trainee may be requested to fill in a reservation book in Spanish but simulated phone calls, emails and faxes with guests will be requested in English.

During the different activities, trainees interact with robots or other trainees that play different roles (customers, travel agents, taxi driver etc.). Dialogues between trainees and robots may be carried out as follows: trainees type text in the communication tool and the robots reply orally and/or in writing using pre-registered responses. Robots are configured and reply to stimuli like new trainee arriving in a scene, or a trainee asking to begin a conversation.

For example, when a trainee asks a question, a robot can automatically select the most appropriate answer or action based on the trainee's actions in virtual reality or based on keywords found in the trainee's communications. For the example trainee questions: (a) "Could you show me your identity card?" would produce the action by the robot of popping up a window with the image of an identity card; (b) "How long will you stay?" would produce an answer by the robot such as "three nights". Also when robots ask questions, a trainee's answer can be used (or not) to select subsequent dialog of the robot. For the example robot question: "Do all the rooms have an Internet connection?", the trainee answer "No" would produce a different response then the trainee answer "Yes".

E.3 Example Activities

This section describes examples of activities that can be performed in a scene.

Reservation by fax: The fax starts to transmit some information from travel agents. When the trainee clicks on the fax in virtual reality, a window pops up at the user interface with an image of the fax. The trainee has to retrieve relevant information from the fax and fill in the reservation book. Afterwards, the trainee needs to write a confirmation fax for the required reservations. Possible problems encountered here include: (a) Not enough rooms so the trainee must find alternatives; (b) Part of the fax is unreadable so the trainee must fax the travel agency to get more information; and (c) Fax is incomplete (i.e., not enough information to fill the reservation book) so the trainee must fax to the travel agency for more information.

Reservation by phone and fax: The phone rings. Clicking on the phone in virtual reality causes a conversation to begin with a customer-robot. During the dialog, the trainee has to understand the requirements of the customer-robot, which are basic customer questions such as: "are pets accepted in this hotel?", "is there a museum next to your hotel?", "do all the rooms have a refrigerator?", "what is the price for rooms with a view?", "what is your address?", "what is your email?", "what is your fax and phone number". After the conversation the trainee receives a confirmation email or fax from the customer, the trainee has to fill in the reservation book and to confirm the reservation by email or fax. A possible problem encountered during the scenario is that the hotel is closed or full during the requested reservation period so the trainee must provide alternative suggestions (e.g., contact tourism office or other hotels, suggest another period).

Modification/cancellation of a reservation: The trainee receives a phone call from a customer-robot who wants to change his reservation. The trainee has to apply the adequate internal procedure and make the new reservation. A possible problem encountered here is that the modification is impossible so trainee must then cancel the reservation or find an alternative.

Customer with reservation: A customer-robot arrives at the reception desk and starts a dialogue with each trainee by saying "hello". The trainee avatar should continue the dialogue and provide a response such as "hello, can I help you?". The customer-robot reacts to a list of predefined answers containing certain key words. Only when the answer is correct will the robot continue the dialog. After a number of incorrect answers some help (e.g., explaining how to welcome a customer) is proposed to the trainee by the system or tutor.

F. Miscellaneous

To recapitulate, the present invention concerns a language learning system in which the network is used to couple users to provide scenarios that simulate real world environments that depict business or social situations using interactive virtual reality. In addition, the language learning system provides a set of linguistic services that provide users access to information available, for example, on the Internet with personalized results for learning that can be shared with other users.

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the components and databases of the learning system may operate together on a single computer system or as standalone components or databases operating on one or more computer systems that are communicatively coupled.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any sub-components or individual parts of one or more processing systems, including software, firmware, hardware, or any combination or sub-combination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the following claims.

The invention claimed is:

1. A system operating on a network for learning a language, the system comprising:
    a memory for storing a scenario having tasks to be carried out in the language;
    a connection manager able to accept one or more simultaneous connections requested over the network from one or more user systems;
    a virtual reality subsystem for representing the scenario in a physical setting in a user interface operating on each user system connected to the learning system;
    a communication subsystem for providing at least one channel over which users of two or more of the user systems can communicate text to each other when carrying out the tasks in the language;
    a set of linguistic tools for receiving and disambiguating an identified term in specified text received from one of the connected user systems; and
    a search subsystem for retrieving information on the network related to the specified text;
    wherein the set of linguistic tools disambiguates the identified term in the information retrieved by the search subsystem to identify example uses having a meaning similar to the identified term in the specified text to aid the users of the user systems to comprehend the text communicated in the language over the at least one channel.

2. The system according to claim 1, wherein each user of the learning system is assigned an account with a profile to access the learning system from their user system operating on the network.

3. The system according to claim 2, wherein the search system selects information sources and filters search results using the profile of the users operating the user systems connected to the learning system.

4. The system according to claim 2, wherein the scenario is customized in accordance with the profile of the users operating the user systems connected to the learning system.

5. The system according to claim 1, further comprising a language guesser for filtering out text communicated using the communication subsystem that is other than in the language.

6. The system according to claim 1, further comprising a language guesser for filtering out search results that are other than in the language.

7. The system according to claim 1, wherein one of the set of linguistic tools measures a language level of text communicated over the at least one channel.

8. The system according to claim 7, wherein a user identified as a tutor is warned when the measure of social behavior over the at least one channel is below a predefined minimum level.

9. The system according to claim 7, wherein the communication subsystem filters text over the at least one channel having a measured social behavior below a predefined minimum level.

10. The system according to claim 1, wherein the set of linguistic tools disambiguates the identified term in the information retrieved by the search subsystem to identify example uses having a meaning dissimilar to the identified term in the specified text.

11. The system according to claim 1, further comprising a recommender subsystem for receiving recommendations from and distributing those recommendations to selected ones of the users operating the user systems connected to the learning system.

12. The system according to claim 1, wherein the communication subsystem invokes a chat window on the user interface on each user system connected to the learning system for displaying text communicated by users that are proximate to each other in the representation of the physical setting.

13. The system according to claim 1, wherein the set of linguistic tools comprises one or more of a spell checker, a thesaurus, a morphological analyzer, a contextual disambiguator, a sense disambiguator, and term extractor.

14. The system according to claim 1, further comprising a converter for converting audio to text for transmission over the communication subsystem.

15. The system according to claim 1, wherein the set of linguistic tools sense disambiguates the identified term in the specified text.

16. The system according to claim 1, wherein the set of linguistic tools syntactically disambiguates the identified term in the specified text.

17. The system according to claim 1, further comprising a session database for recording session history of the tasks of the scenario carried out by the users operating the user systems connected to the learning system.

18. The system according to claim 17, wherein the session history provides a measure of one of user language ability and user capacity for carrying out assigned tasks.

19. A method for learning a language using a system operating on a network, the method performed at the system comprising:
    storing in a memory a scenario having tasks to be carried out in the language;
    accepting one or more simultaneous connections requested over the network from one or more user systems;
    representing the scenario in a physical setting in a user interface operating on each user system connected to the learning system;
    providing at least one channel over which users of two or more of the user systems can communicate text with each other when carrying out the tasks in the language;
    receiving and disambiguating an identified term in specified text received from one of the connected user systems; and
    retrieving information on the network related to the specified text;
    wherein said receiving and disambiguating further comprises disambiguating the identified term in the information retrieved to identify example uses having a meaning similar to the identified term in the specified text to aid the users of the user systems to comprehend the text communicated in the language over the at least one channel.

20. An article of manufacture for use in a machine comprising:
- a) a memory;
- b) instructions stored in the memory for operating a system on a network for Learning a language, the instructions being machine readable by the system and performing a method, the method comprising:
   - storing in a memory a scenario having tasks to be carried out in the language;
   - accepting one or more simultaneous connections requested over the network from one or more user systems;
   - representing the scenario in a physical setting in a user interface operating on each user system connected to the learning system;
   - providing at least one channel over which users of two or more of the user systems can communicate text with each other when carrying out the tasks in the language;
   - receiving and disambiguating an identified term in specified text received from one of the connected user systems; and
   - retrieving information on the network related to the specified text;
   - wherein said receiving and disambiguating further comprises disambiguating the identified term in the information retrieved to identify example uses having a meaning similar to the identified term in the specified text to aid the users of the user systems to comprehend the text communicated in the language over the at least one channel.

\* \* \* \* \*